United States Patent [19]

De Loof

[11] Patent Number: 4,587,074
[45] Date of Patent: May 6, 1986

[54] MANUFACTURE OF ELASTOMERIC BLADDERS, PARTICULARLY FOR PRESSURE VESSELS

[75] Inventor: Jean P. De Loof, Brest, France

[73] Assignee: Olaer Industries S.A., Colombes, France

[21] Appl. No.: 543,083

[22] Filed: Oct. 18, 1983

[30] Foreign Application Priority Data

Oct. 22, 1982 [FR] France .................. 82 17696

[51] Int. Cl.[4] .......................................... B29C 49/20
[52] U.S. Cl. ................................. 264/516; 264/501
[58] Field of Search ............... 264/501, 506, 515, 516, 264/523, 524, 535

[56] References Cited

U.S. PATENT DOCUMENTS

| | | | |
|---|---|---|---|
| 1,310,437 | 7/1919 | Roberts | 264/516 |
| 2,505,099 | 4/1950 | Costello | 264/516 X |
| 2,626,885 | 1/1953 | Gollings | 264/516 X |
| 2,971,220 | 2/1961 | Davis | 264/501 |
| 3,358,062 | 12/1967 | Lemelson | 264/524 X |

FOREIGN PATENT DOCUMENTS

| | | |
|---|---|---|
| 642203 | 8/1950 | United Kingdom . |
| 2084505 | 4/1982 | United Kingdom . |

Primary Examiner—Jan Silbaugh
Attorney, Agent, or Firm—Arthur B. Colvin

[57] ABSTRACT

An elastomeric bladder for dividing a pressure vessel into two chambers is formed in one piece and carries integrally at least one rigid element (18 or 19). A tubular blank bladder 10A of raw elastomer is shaped in a mould by fluid pressure applied to the interior of the blank while the rigid elements 18, 19 are clamped against the ends E1, E2 of the bladder valve and a vulcanization is performed whereby the rigid elements 18, 19 are bonded to the bladder.

6 Claims, 5 Drawing Figures

4,587,074

MANUFACTURE OF ELASTOMERIC BLADDERS, PARTICULARLY FOR PRESSURE VESSELS

BACKGROUND OF THE INVENTION

The invention relates to a method of manufacturing an elastomeric bladder carrying integrally at least one rigid element and deals more particularly with such a bladder carrying two rigid elements respectively arranged at its two ends, particularly two elements, one of which is a gas charging valve body and the other of which is a button to close a liquid orifice.

The invention relates particularly to such an elastomeric bladder for a pressure vessel having a gas charging orifice at one end and liquid orifice at the other end, the bladder being fitted in the pressure vessel and dividing it into two chambers which communicate respectively with the gas charging orifice and with the liquid orifice, the gas charging valve body of the bladder being fitted in the gas charging orifice of the pressure vessel, whereas the button of the bladder is adapted to be applied closingly to a seat formed in the pressure vessel around said liquid orifice.

PRIOR ART

Bladders of the above-mentioned type are generally manufactured in two or more parts, one of which carries the valve body attached to one end, whereas the other carries the button attached to the other end. The assembly of the parts of the bladder is effected by elastomer-to-elastomer bonding. This operation necessitates various work stages for the preparation of the surfaces to be bonded and requires the provision of appliances to permit the assembled joints to be pressurised and heated. Despite these precautions, faults may appear in the region of the bonding or in the assembly of the parts, for example in the correct alignment of the two parts of the bladder and possible eccentricity of the button relative to the axis of the bladder.

OBJECT OF THE INVENTION

An object of the invention is to provide a method of manufacturing an elastomeric bladder carrying integrally at least one rigid element and preferably two opposed rigid elements such as a gas charging valve body and a closure button for a liquid orifice, which permits these disadvantages to be eliminated and ensures formation of the bladder in one piece with excellent attachment and centering of the rigid element or elements.

OUTLINE OF THE INVENTION

The method according to the invention is particularly characterised by the fact that one starts from a blank bladder of raw elastomer which is shaped by the effect of fluid pressure with the rigid element placed adjacent to the bladder and a vulcanisation is performed, during which the rigid element or elements is attached to the bladder.

By virtue of this arrangement, the bladder is formed in a single piece, and the difficulties which result from bonding together two parts of a bladder are avoided.

Moreover, the method is economical and permits large series manufacture. The fixing of the rigid element to the bladder is excellent. The centering of the rigid element relative to the bladder is highly precise.

According to another characteristic of the method according to the invention, the bladder blank of raw elastomer is tubular, whilst the shaping of the bladder is defined by a mould surrounding the blank, the fluid pressure being developed within the tubular blank in order to expand it and apply it against the mould.

Where the rigid element comprises an orifice, the fluid pressure is preferably developed by passage through this orifice.

According to another characteristic of the method according to the invention, before the blank bladder is shaped, this blank is folded and clamped between the rigid element and a support piece of complementary configuration, so as to maintain the rigid element adjacent to the bladder during the shaping and the vulcanisation.

The invention likewise has as an object to provide a mould for performing the method.

This mould is particularly characterised in that it comprises two sections, the joint plane of which is a plane of symmetry passing through the longitudinal axis, and which are adapted to be fixed to each other detachably, at least one bushing adapted to be fitted between said sections at least one end of the mould, a support piece fitted slidably in the bushing and having a face, the configuration of which is complementary to that of the rigid element, and which is adapted to clamp the end of the blank bladder against the rigid element and a pin adapted to be fixed detachably to the rigid element and fitted slidably in the support piece to permit the clamping of the end of the bladder blank between the rigid element and the support piece.

The bushing is preferably positioned in the mould by abutment against a shoulder of the mould and is maintained thus positioned in the mould by a detachable locking means, whilst one end of the tubular blank is adapted to engage inside the bushing, the support piece being fitted slidably in the bushing between a first position disengaged from the tubular blank and a second position which is defined by the abutment of the support piece against the bushing and wherein the support piece folds said end of the tubular blank and clamps it against the rigid element.

The invention likewise has as an object to provide an elastomeric bladder manufactured by the above-mentioned method and/or by means of the above-mentioned mould, this bladder carrying two rigid elements respectively arranged at its two ends, one of which is a gas charging valve body and the other of which is a button to close a liquid orifice, which has been attached to the bladder during the vulcanisation of the elastomer shaped by fluid pressure.

The invention also has as an object to provide a pressure vessel comprising an elastomeric bladder as defined above, the pressure vessel having a gas charging orifice at one end and a liquid orifice at the other end, the bladder being fitted in the pressure vessel and dividing it into two chambers which communicate respectively with the gas charging orifice and with the liquid orifice, the gas charging valve body of the bladder being fitted in the gas charging orifice of the pressure vessel and the button of the bladder being applied closingly to a valve seat formed in the pressure vessel around the liquid orifice.

BRIEF DESCRIPTION OF THE DRAWINGS

An embodiment of the invention is described below by way of example with reference to the accompanying drawings, wherein.

PREFERRED EMBODIMENT

Figure 1:
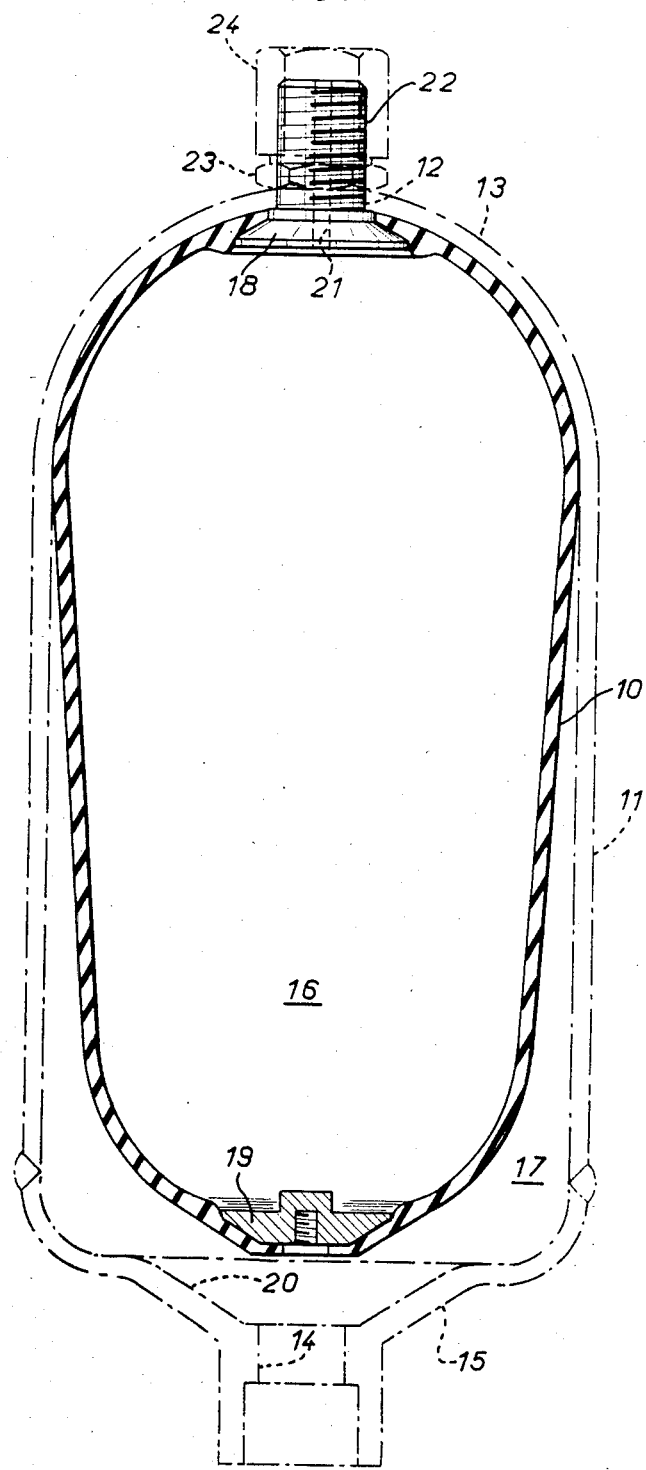
FIG. 1 is a sectional view of a bladder according to the invention, fitted in a pressure vessel shown by chain-doted lines.

Reference will first be made to FIG. 1, which illustrates a bladder according to the invention, generally designated 10, fitted in a pressure vessel, such as a hydropneumatic accumulator shown in chain-dotted lines and generally designated 11.

The pressure vessel 11 has a gas charging orifice 12 at one end 13 and a liquid orifice 14 at the other end 15. The bladder 10 is fitted in the pressure vessel 11 and divides it into a gas chamber 16 which communicates with the gas charging orifice 12 and a liquid chamber 17 which communicates with the liquid orifice 14.

The elastomeric bladder 10 carries integrally two rigid elements 18 and 19 which are respectively arranged at its two ends and which preferably have frustoconical shapes, as illustrated. The element 18 is a gas valve body which is adapted to be fitted in the orifice 12, whereas the element 19 is a button which is adapted to be applied as a valve member closingly onto a valve seat 20 formed in the vessel 11 around the orifice 14.

The valve body 18 has a central bore 21 to permit the chamber 16 to be charged with gas. The valve body 18 also has a screw-threaded stem 22 which is engaged in the orifice 12 and which receives a nut 23 to lock the body 18 in position. A cap 24 is also screwed onto the screw-threaded stem 22 of the body 18.

The orifice 14 is intended to be connected to a hydraulic line.

In order to operate the pressure vessel, gas is first of all blown in under pressure through the passage 21 into the chamber 16, which applies the bladder 10 against the internal wall of the vessel 11 and presses the valve member button 19 into closure on the seat 20.

When liquid is admitted from the hydraulic line into the orifice 14 at a higher pressure than the precharge pressure of the gas in the chamber 16, the liquid enters the chamber 17, lifting the button 19 away from the seat 20 and compressing the bladder 10. The hydropneumatic accumulator is then in its operative state.

The bladder 10 is in one piece and carries both the gas valve body 18, and the liquid closure button 19 which are both bonded to the bladder 10.

In order to manufacture this bladder, one starts with a mould in two sections 25 and 26 (FIGS. 2 and 3), the joint plane of which is a plane of symmetry passing through the longitudinal axis of the mould.

The two sections 25 and 26 of the mould are adapted to be fixed to each other detachably by bolting at 25a. At one of the ends of the mould, a bushing 27 is adapted to be fitted between the parts 25 and 26. This bushing 27 is positioned in the mould 25, 26 by abutment against a shoulder 28 of the mould 25, 26 and is maintained thus positioned in the mould 25, 26 by a detachable locking means 29. The latter comprises, for example, a pointed screw which is engaged in a screwthreaded orifice 30 of the mould section 25 and the point 31 of which penetrates into a cavity 32 made in the bushing 27.

A support piece 33 is fitted slidably in the bushing 27 and has a face 34, the configuration of which, preferably frustoconical, is advantageously complementary to that of the valve body 18 and is adapted to fold the corresponding end of the blank without danger of the prejudicial crushing, as will become clear below. A pin 35 is adapted to be fixed detachably to the valve body 18 and is fitted slidably in the support piece 33. In the example illustrated, the pin 35 is fixed to the valve body 18 by being screwed to the screw-threaded stem 22 of this body 18. Also, the pin 35 has a bore 36 to communicate with the bore 21 of the valve body 18.

The other end of the mould 25, 26 is equipped with a device similar to that which has just been described, and which comprises a bushing 27, a support piece 33, the face 34' of which cooperates with the button 19, and a pin, designated 35', which is similar to the pin 35 which is fitted slidably in the support piece 33, whilst being detachably fixed to the button 19. However, the pin 35' is here fixed to the button 19 by means of a screw-threaded stud 37 of the pin 35' which is screwed into a tapped hole 38 of the button 19.

Figure 2:
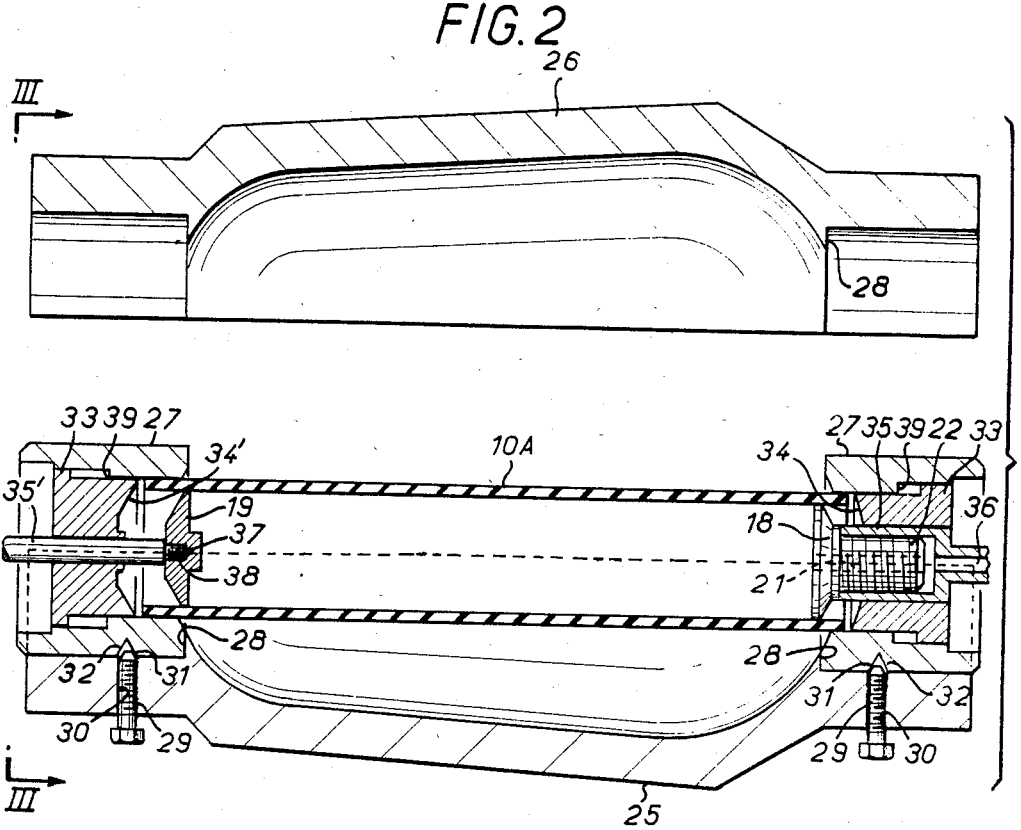
FIG. 2 illustrates the manufacture of the bladder in a mould, the tubular blank of the raw elastomeric bladder being first of all placed in a lower part of the mould.
Figure 3:
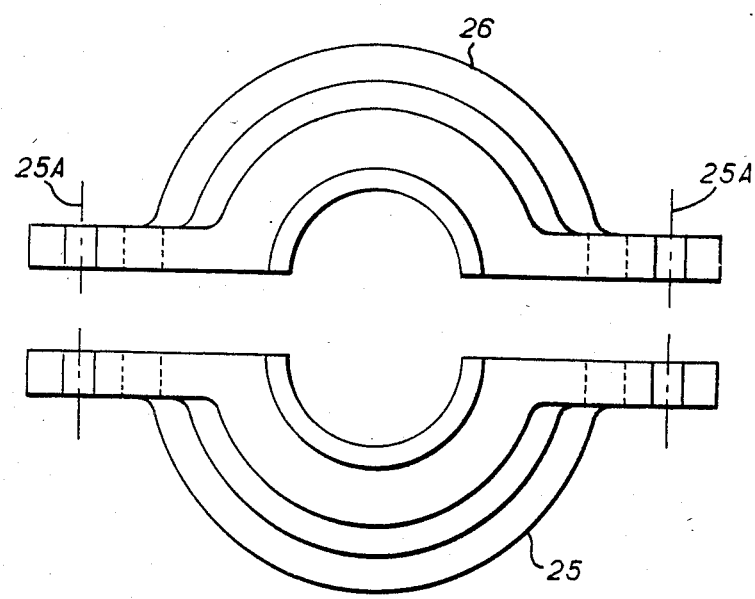
FIG. 3 is a corresponding view as indicated by the arrows III—III of FIG. 2.

In order to manufacture the bladder, one starts with a tubular blank 10A (FIG. 2) of crude elastomer. The valve body 18 carried by the pin 35 is engaged in one end of the blank 10A and the button 19 carried by the pin 35' in the other end of the blank 10A. The pins 35 and 35' are themselves engaged in the support pieces 33 which are arranged in the bushings 27 which are placed on the mould section 25. The two ends of the tubular blank 10A are engaged inside the bushings 27. In each bushing 27 the support piece 33 is placed in a first position which is disengaged from the tubular blank 10A, (FIG. 2). Each bushing 27 is itself positioned in the mould section 25 by abutment against the corresponding shoulder 28 and is locked by the pointed screw 29. The second mould section 26 is then assembled with the first mould section 25 at 25A and the two mould sections 25, 26 surmount the bushings 33 in which the ends of the tubular blank 10A are engaged.

Figure 4:
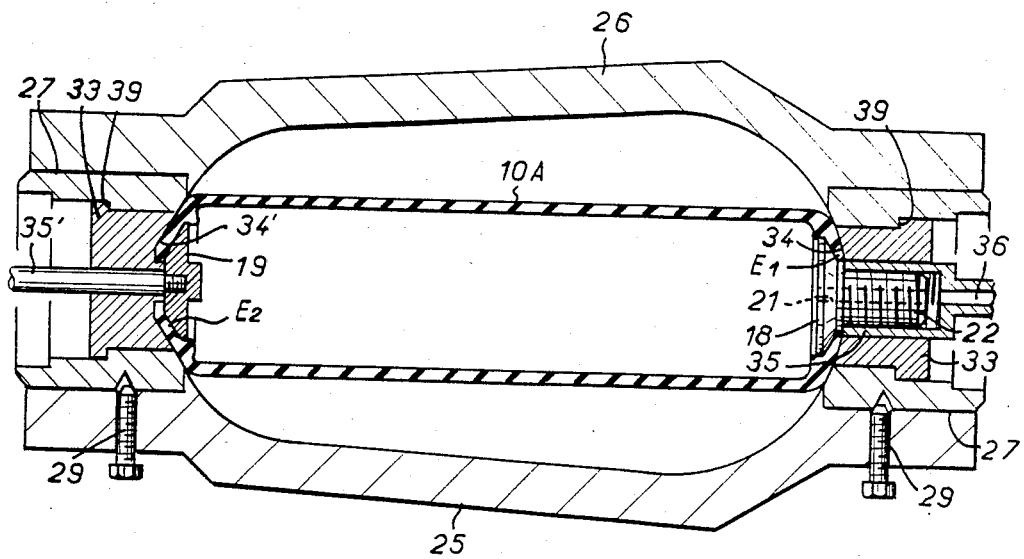
FIG. 4 is a similar view to FIG. 2, but in which the ends of the tubular blank of the bladder are clamped against the gas valve body and against the button.

In each bushing 27 the support piece 33 is fitted so as to be slidable between a first position, disengaged from the tubular blank 10A, which is illustrated in FIG. 2, and a second position (FIG. 4), which is defined by abutment at 39 of the support piece 33 against the bushing 27. In passing from the first position (FIG. 2) into the second position (FIG. 4), the support piece 33 folds the corresponding end of the tubular blank 10A at E1 and E2 and clamps it, without danger of prejudicial crushing, against the rigid element 18 or 19 which is subject to a traction outwards to clamp the end E1, E2 between the rigid element 18, 19 and the face 34, 34' of the support piece 33. Appropriate conventional means are provided to lock the various elements in position.

Figure 5:
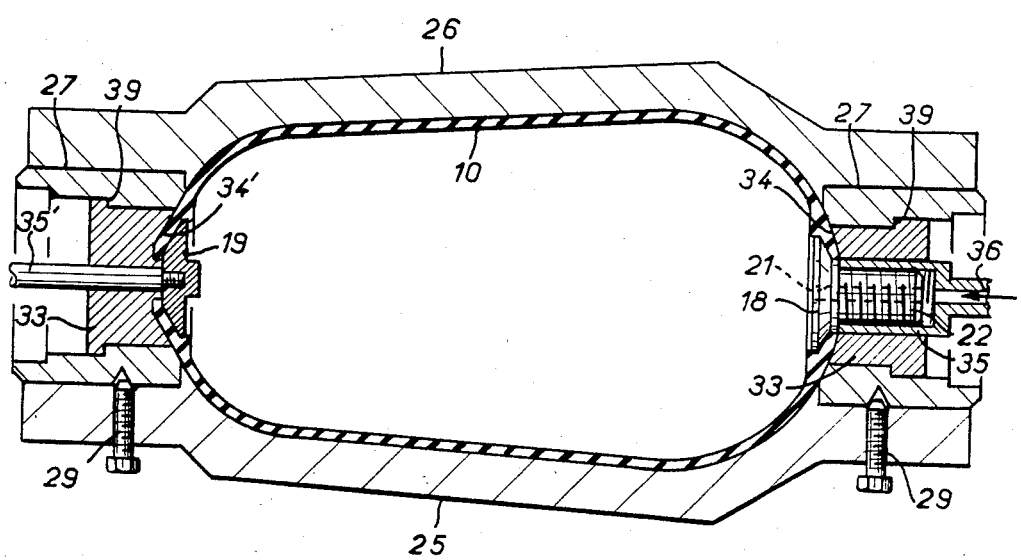
FIG. 5 is a view similar to FIG. 4 after the bladder has been shaped by the effect of hydrostatic pressure for the purpose of the vulcanisation of the bladder, during which the gas valve body and the button are attached to the bladder.

The blank bladder 10A is then shaped (FIG. 5) by the effect of fluid pressure, the pressure being developed by passing fluid through the orifices 36 and 21, within the tubular blank 10A to expand it and apply it against the mould 25, 26 at 10. This pressure may be effected by any appropriate liquid or gaseous fluid.

The vulcanisation is then performed, during which the valve body 18 and the button 19 are attached to the bladder 10.

After vulcanization, the pressure inside the shaped tube is relieved, the mold is opened, and the resultant bladder removed from the mold.

It will be observed that the various operations previously described and their programming may be automated in any appropriate manner.

It will be appreciated that the method which has just been described permits convenient and economic manufacture of a bladder in one piece, carrying the valve body 18 and the button 19.

It will likewise be appreciated that the bladder in one piece is subjected only to a single vulcanisation, the conditions of which can be chosen freely to give the bladder the optimum mechanical characteristics, whereas in multi-piece bladders a second vulcanisation is necessary to assemble the various parts of the bladder attachment, which risks impairing the desired mechanical qualities.

I claim:

1. The method of manufacturing an elastic bladder with at least one bonded rigid element having an aperture formed therein comprising the steps of providing a tube of raw elastomer introducing said tube into a mold having a mold surface substantially complementary to that of the desired bladder, said mold including an end portion closely encompassing an end of said tube and an insert movable axially within said end portion introducing said rigid element through said end of said tube into the interior thereof, thereafter causing said end portion of said tube to be deformed axially into engagement with said element by axial inward shifting movement of insert to thereby clamp said end portion of said tube between said insert and said element, closing said mold, introducing fluid into said tube through said aperture of said element to thereby expand said tube against said mold surface, thereafter vulcanizing said shaped raw elastomer to thereby bond said element to said shaped elastomer, relieving the pressure inside said tube, opening the mold and removing the resultant bladder.

2. A method according to claim 1, wherein the distance between ends of the tube remains constant during shaping and vulcanization.

3. A method according to claim 1, wherein the mold comprises two parts in contact with each other along a longitudinal parting line when the mold is closed.

4. A method according to claim 1, wherein the tube of raw elastomer is a hollow cylinder of constant section.

5. A method according to claim 1, in which, before the tube is shaped, an end of the tube is folded and clamped between said rigid element and a support member presenting a support surface of substantially complementary configuration to said rigid element so as to maintain the rigid element in position during said shaping and vulcanisation steps.

6. A method according to claim 5, in which said configuration of the support surface is frustoconical.

* * * * *